(12) United States Patent
Wang

(10) Patent No.: US 8,413,936 B2
(45) Date of Patent: Apr. 9, 2013

(54) VIDEO CAMERA SUPPORT DEVICE THAT CAN BE OPERATED IN TWO DIFFERENT MANNERS

(76) Inventor: Tai-Shun Wang, Shalu Township, Taichung County (TW)

( * ) Notice: Subject to any disclaimer, the term of this patent is extended or adjusted under 35 U.S.C. 154(b) by 231 days.

(21) Appl. No.: 12/975,475

(22) Filed: Dec. 22, 2010

(65) Prior Publication Data

US 2012/0160980 A1   Jun. 28, 2012

(51) Int. Cl.
*F16M 11/00*   (2006.01)
(52) U.S. Cl.
USPC ........... 248/161; 248/155; 396/419; 396/420; 396/424; 352/243
(58) Field of Classification Search .................. 248/161, 248/155, 405, 176.1; 396/419, 420, 424, 396/425, 428; 224/265, 185, 908; 352/243
See application file for complete search history.

(56) References Cited

U.S. PATENT DOCUMENTS

| | | | | |
|---|---|---|---|---|
| 4,976,387 A * | 12/1990 | Spianti | .......................... | 224/262 |
| 5,243,370 A * | 9/1993 | Slater | ............................ | 352/243 |
| 5,650,821 A * | 7/1997 | Hewlett | ........................ | 348/373 |
| 6,578,967 B1 * | 6/2003 | Paddock et al. | ................ | 352/243 |
| 7,192,203 B2 * | 3/2007 | Schaller | ......................... | 396/421 |
| 7,390,131 B2 * | 6/2008 | Schaller | ......................... | 396/421 |
| 8,267,364 B2 * | 9/2012 | Church | ....................... | 248/227.4 |

* cited by examiner

*Primary Examiner* — Amy J. Sterling
(74) *Attorney, Agent, or Firm* — Alan Kamrath; Kamrath IP Lawfirm, P.A.

(57) ABSTRACT

A support device includes a platform, a connecting rod connected with the platform, a main support unit connected with the connecting rod, a weight member connected with the main support unit, two opposite clamping boards each pivotally mounted on the weight member, a swivel mechanism swivelably mounted between the connecting rod and the main support unit, a pivot member pivotally mounted on the swivel mechanism, and an auxiliary support unit connected with the pivot member. Thus, the video camera support device can be operated in two different manners to facilitate a user carrying the video camera. In addition, when the platform is moved by the user, the platform is kept at a horizontal state by provision of the weight member and the clamping boards so that the video camera is moved solidly and stably.

9 Claims, 12 Drawing Sheets

VIDEO CAMERA SUPPORT DEVICE THAT CAN BE OPERATED IN TWO DIFFERENT MANNERS

BACKGROUND OF THE INVENTION

1. Field of the Invention

The present invention relates to a support device and, more particularly, to a support device for supporting a video camera.

2. Description of the Related Art

A conventional stand, such as a tripod and the like, is used to support a video camera so that the video camera is operated stably. However, when the user has to hold the stand to move the video camera, the video camera is easily swayed or vibrated during forward and backward movement of the stand such that the video camera is not moved smoothly and stably, thereby decreasing the working efficiency and quality of the video camera. In addition, the user has to hold the stand to support the video camera by his hand or shoulder so that the weight of the video camera causes a larger burden to the user during a long-term utilization.

BRIEF SUMMARY OF THE INVENTION

In accordance with the present invention, there is provided a support device, comprising a platform, a connecting rod connected with the platform, a main support unit connected with the connecting rod, a weight member connected with the main support unit, two opposite clamping boards each pivotally mounted on the weight member, a swivel mechanism swivelably mounted between the connecting rod and the main support unit, a pivot member pivotally mounted on the swivel mechanism, and an auxiliary support unit connected with the pivot member.

According to the primary advantage of the present invention, the video camera support device can be operated in two different manners to facilitate a user carrying the video camera.

According to another advantage of the present invention, when the platform is moved by the user, the platform is kept at a horizontal state by provision of the weight member, the clamping boards and the counterweights so that the video camera is moved solidly and stably.

According to a further advantage of the present invention, the two pivot arms of the pivot member can be pivoted about the two pivot holes of the rotation sleeve so that the pivot member can be pivoted relative to the rotation sleeve to eliminate sway or vibration produced during forward and backward movement of the auxiliary support unit such that the video camera is moved smoothly and stably.

According to a further advantage of the present invention, when the auxiliary support unit is swiveled leftward and rightward, the rotation sleeve can be swiveled relative to the connecting rod by the bearing so that the video camera is moved and directed forward without producing deflection.

According to a further advantage of the present invention, when the auxiliary support unit is held by the user's hand, the weight member is placed on the user's shoulder with the clamping boards clamping the user's shoulder, so that the burden of the video camera is shared by the user's shoulder and hand.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
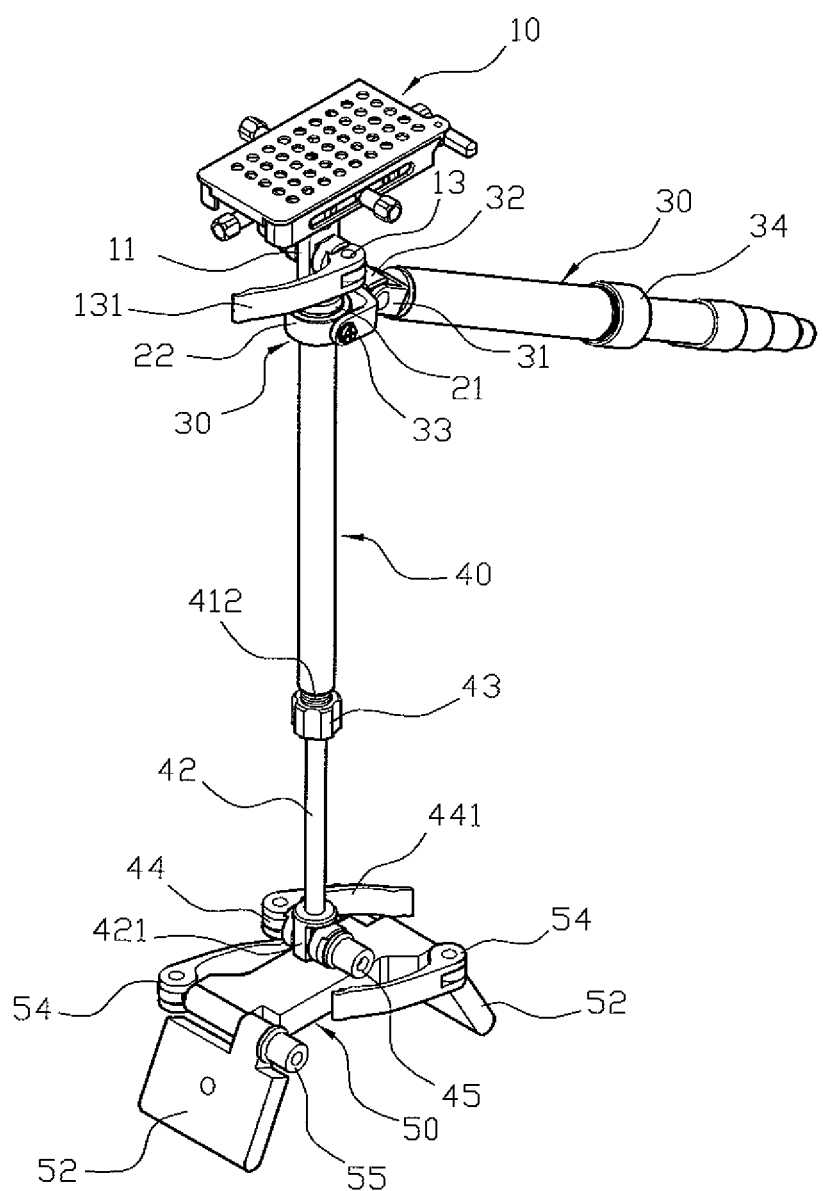
FIG. 1 is a perspective view of a support device for a video camera in accordance with the preferred embodiment of the present invention.
Figure 2:
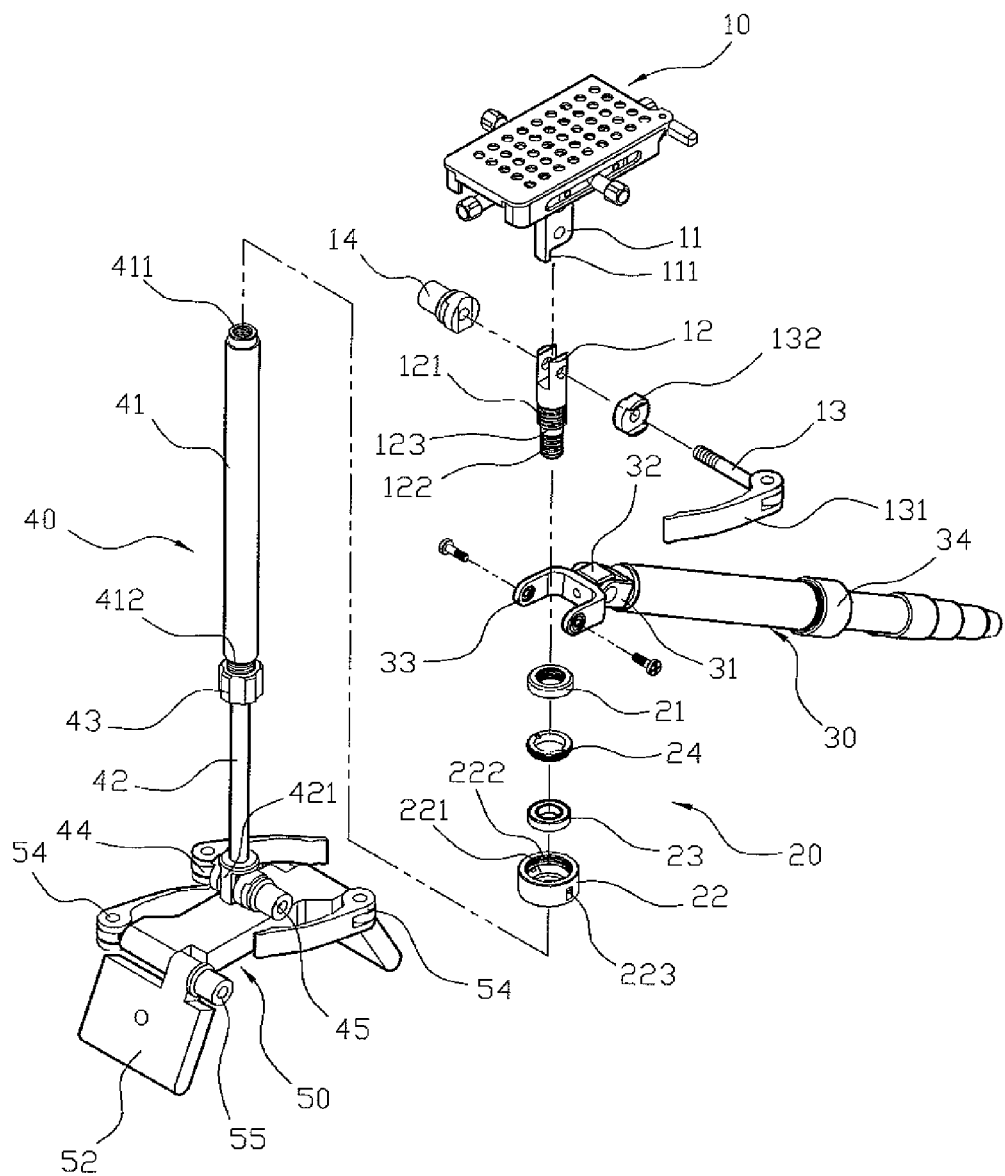
FIG. 2 is an exploded perspective view of the support device for a video camera as shown in FIG. 1.
Figure 3:
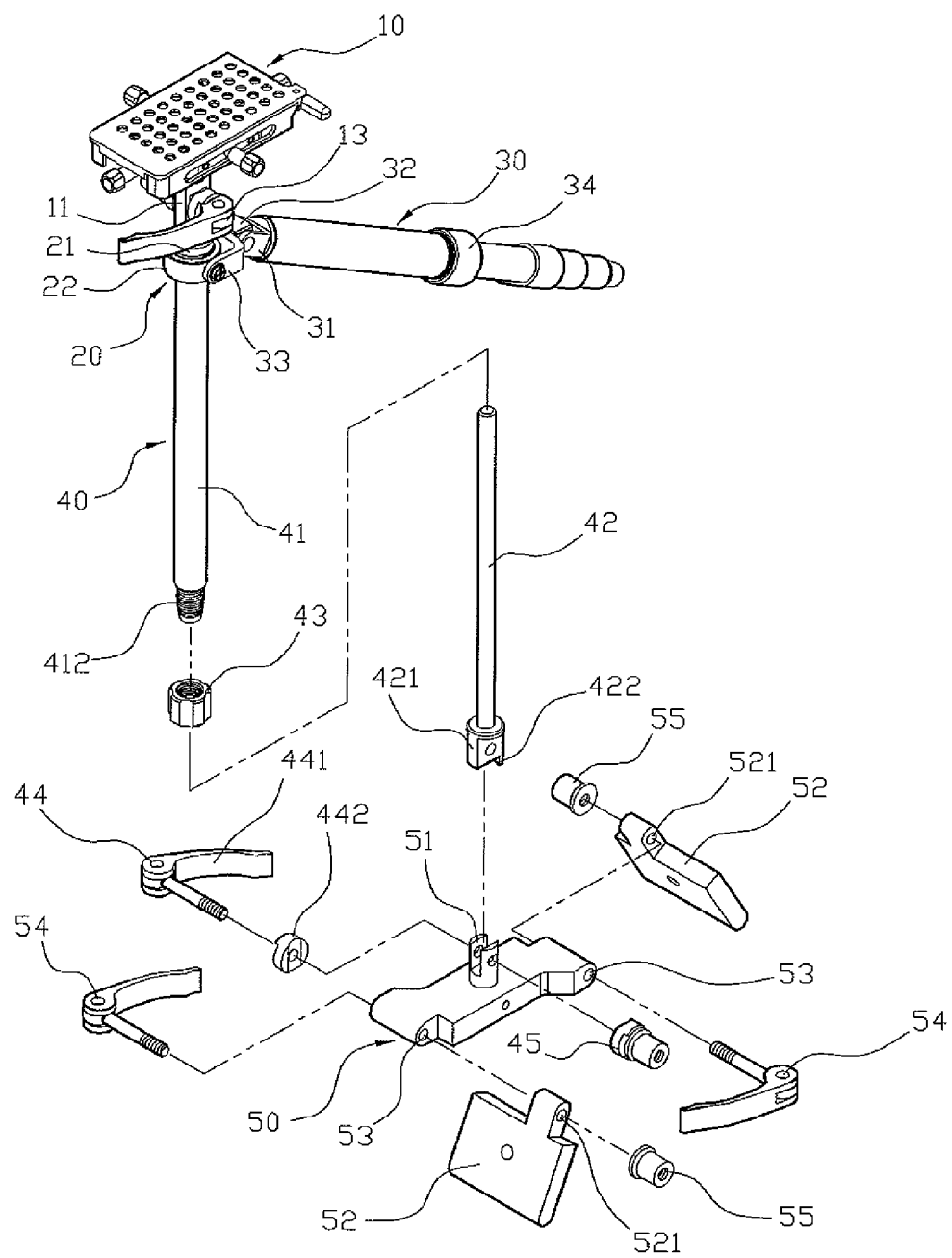
FIG. 3 is an exploded perspective view of the support device for a video camera as shown in FIG. 1.

Referring to the drawings and initially to FIGS. 1-4, a support device for a video camera in accordance with the preferred embodiment of the present invention comprises a platform 10, a connecting rod 12 connected with the platform 10, a main support unit 40 connected with the connecting rod 12, a weight member 50 connected with the main support unit 40, two opposite clamping boards 52 each pivotally mounted on the weight member 50, a swivel mechanism 20 swivelably mounted between the connecting rod 12 and the main support unit 40, a pivot member 32 pivotally mounted on the swivel mechanism 20, and an auxiliary support unit 30 connected with the pivot member 32.

The platform 10 has a side provided with a connecting plate 11. The connecting plate 11 is perpendicular to the platform 10.

The connecting rod 12 has a first end pivotally connected with the connecting plate 11 of the platform 10. The connecting rod 12 has a second end provided with a first threaded portion 121, a stepped abutting portion 123 and a second threaded portion 122. The abutting portion 123 of the connecting rod 12 is disposed between the first threaded portion 121 and the second threaded portion 122. The first threaded portion 121 of the connecting rod 12 has a diameter greater than that of the second threaded portion 122. The first end of the connecting rod 12 is pivotally connected with the connecting plate 11 of the platform 10 by a quick release module 13 and a locking nut 14. The quick release module 13 is provided with a drive handle 131, and the support device further comprises a catch block 132 mounted on the quick release module 13 and located between the connecting rod 12 and the drive handle 131 of the quick release module 13 to limit the drive handle 131 of the quick release module 13 when the quick release module 13 is loosened.

In the preferred embodiment of the present invention, the connecting plate 11 of the platform 10 is provided with a protruding limit strip 111 abutting a peripheral wall of the connecting rod 12 to limit a pivot angle of the connecting rod 12 relative to the connecting plate 11 so that the connecting rod 12 is in line with the connecting plate 11.

The swivel mechanism 20 includes a rotation sleeve 22 swivelably mounted on the connecting rod 12, a bearing 23 mounted in the rotation sleeve 22 and having a first side abutting the abutting portion 123 of the connecting rod 12, a stop member 24 secured in the rotation sleeve 22 and abutting the bearing 23 to limit the bearing 23 in the rotation sleeve 22, and a locking member 21 mounted on the first threaded portion 121 of the connecting rod 12 and movable to press the stop member 24 to releasably lock the rotation sleeve 22 onto the connecting rod 12.

The rotation sleeve 22 of the swivel mechanism 20 has an outer wall provided with two opposite pivot holes 223. The rotation sleeve 22 of the swivel mechanism 20 has an inner portion provided with a receiving hole 221 to receive the bearing 23. The receiving hole 221 of the rotation sleeve 22 is mounted on the connecting rod 12 and has a peripheral wall provided with an inner thread 222. The stop member 24 of the swivel mechanism 20 is an outer threaded ring which is screwed into the inner thread 222 of the rotation sleeve 22. The stop member 24 of the swivel mechanism 20 surrounds the first threaded portion 121 of the connecting rod 12. The locking member 21 of the swivel mechanism 20 is an inner threaded ring which is screwed onto the first threaded portion 121 of the connecting rod 12. The bearing 23 of the swivel mechanism 20 surrounds the second threaded portion 122 of the connecting rod 12 and is disposed between the stop member 24 and the rotation sleeve 22.

The auxiliary support unit 30 is a telescoping arrangement and has a mediate portion provided with an adjusting nut 34 to adjust the length of the auxiliary support unit 30. The auxiliary support unit 30 has an end portion provided with a pivot bracket 31 which is pivotally connected with the pivot member 32.

The pivot member 32 has a substantially U-shaped profile and has a side provided with two opposite pivot arms 33 pivotally connected with the two pivot holes 223 of the rotation sleeve 22 respectively so that the pivot member 32 is pivotally connected with the rotation sleeve 22. The two pivot arms 33 of the pivot member 32 are pivotable about the two pivot holes 223 of the rotation sleeve 22 respectively so that the pivot member 32 is pivotable relative to the rotation sleeve 22.

Figures 4, 4A:
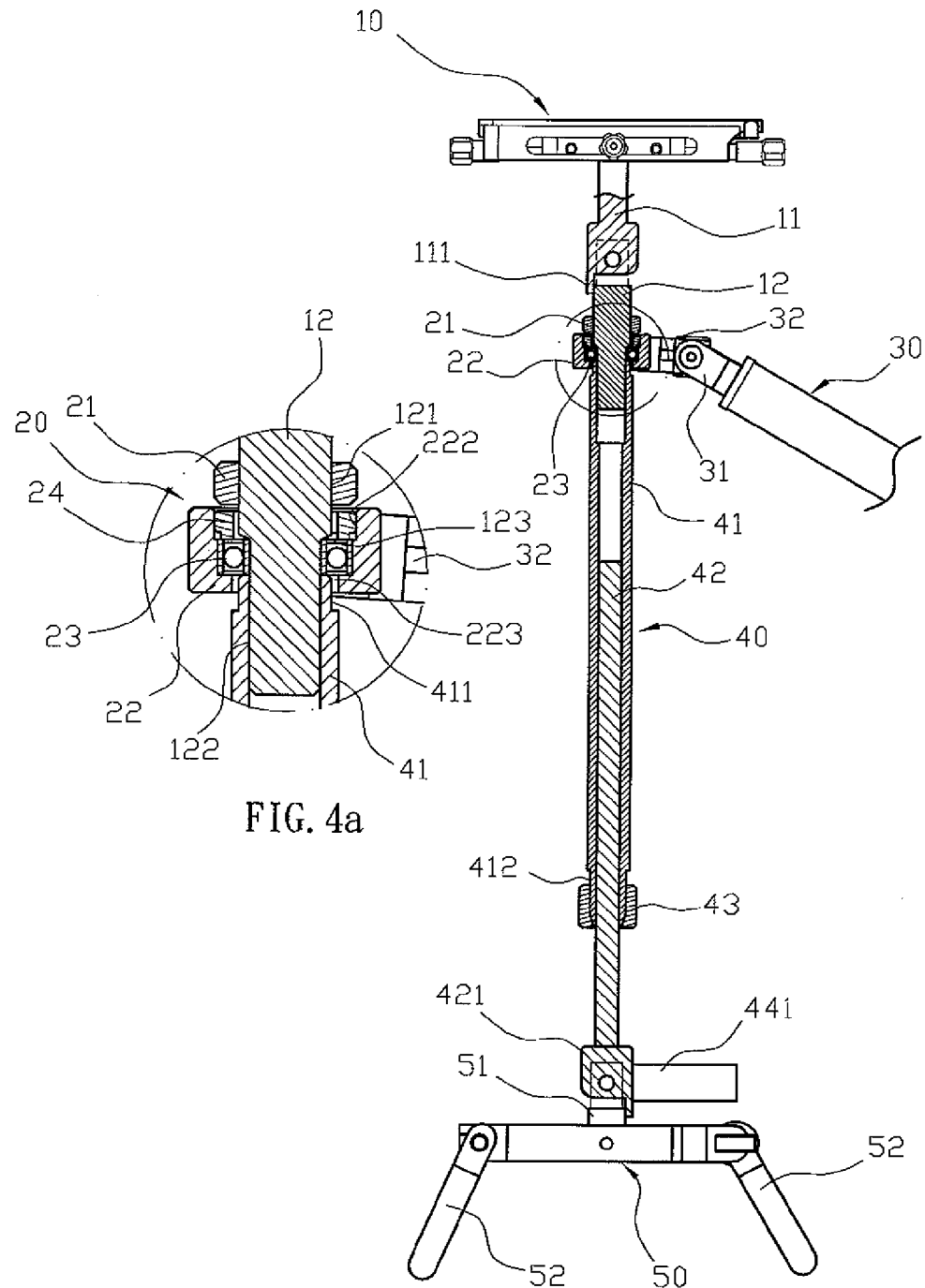
FIG. 4 is a front cross-sectional view of the support device for a video camera as shown in FIG. 1.
FIG. 4a is a locally enlarged view of the support device for a video camera as shown in FIG. 4.

The main support unit 40 is a telescoping arrangement and includes an outer tube 41 and an inner bar 42 retractably mounted on the outer tube 41. The outer tube 41 of the main support unit 40 has a first end provided with an inner threaded portion 411 screwed onto the second threaded portion 122 of the connecting rod 12 and abutting a second side of the bearing 23 so that the bearing 23 is sandwiched between the connecting rod 12 and the outer tube 41. The inner threaded portion 411 of the outer tube 41 is inserted into the receiving hole 221 of the rotation sleeve 22 as shown in FIG. 4a. The inner bar 42 of the main support unit 40 has a first end movable in the outer tube 41 and a second end provided with a pivot portion 421. The outer tube 41 of the main support unit 40 has a second end provided with an outer threaded portion 412, and the main support unit 40 further includes an adjusting nut 43 screwed onto the outer threaded portion 412 of the outer tube 41 to releasably lock the outer tube 41 onto the inner bar 42 so as to adjust a length of the outer tube 41 and the inner bar 42.

The weight member 50 has a side provided with a pivot seat 51 pivotally connected with the pivot portion 421 of the inner bar 42. The pivot seat 51 of the weight member 50 is pivotally connected with the pivot portion 421 of the inner bar 42 by a quick release mechanism 44 and a locating nut 45. The quick release mechanism 44 is provided with a drive handle 441, and the support device further comprises a catch piece 442 mounted on the quick release mechanism 44 and located between the pivot seat 51 of the weight member 50 and the drive handle 441 of the quick release mechanism 44 to limit the drive handle 441 of the quick release mechanism 44 when the quick release mechanism 44 is loosened.

In the preferred embodiment of the present invention, the pivot portion 421 of the inner bar 42 is provided with a protruding limit flange 422 to abut a peripheral wall of the pivot seat 51 to limit a pivot angle of the pivot seat 51 and the weight member 50 relative to the inner bar 42 so that the inner bar 42 is in line with the pivot seat 51 and is perpendicular to the weight member 50.

Each of the two clamping boards 52 is pivotally connected with the weight member 50 by a quick release member 54 and a fastening nut 55. In the preferred embodiment of the present invention, the weight member 50 has two opposite ends each provided with a through hole 53 to allow passage of the quick release member 54, and each of the two clamping boards 52 has an end portion each provided with a through bore 521 to allow passage of the quick release member 54.

Figure 5:
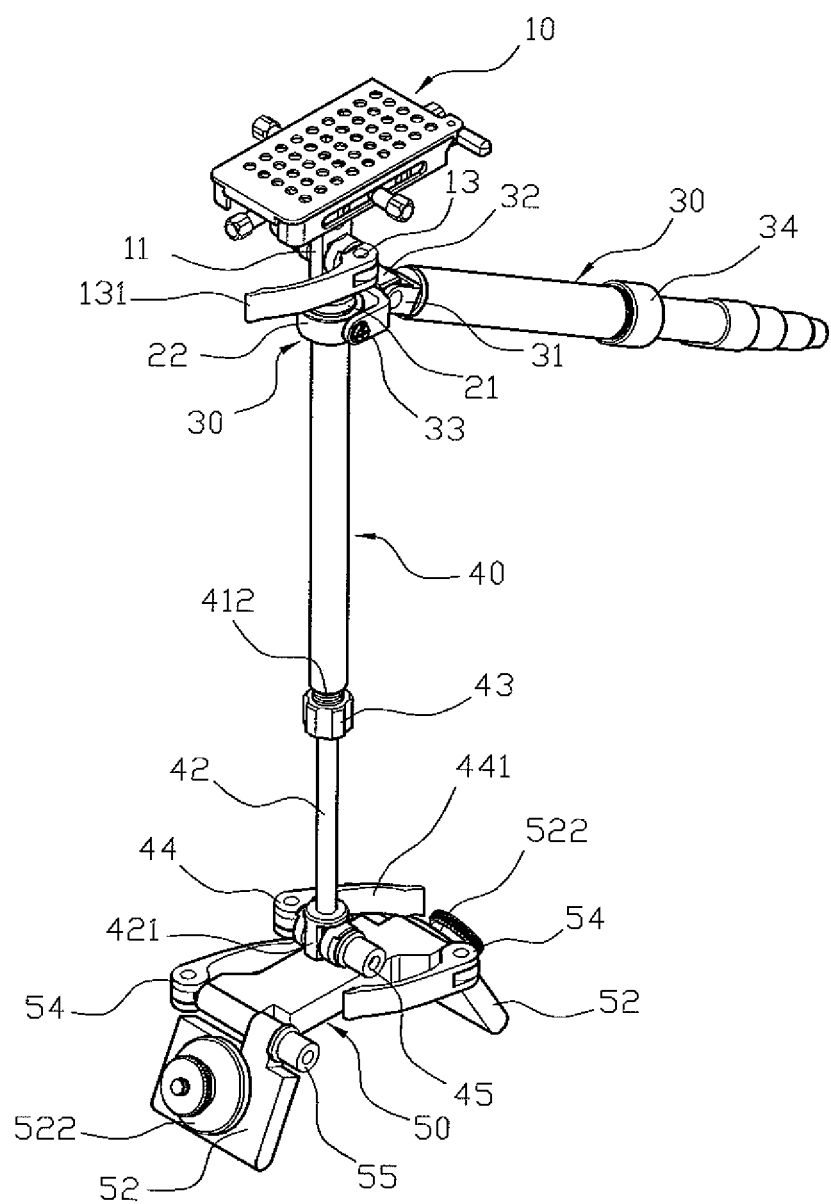
FIG. 5 is a perspective view of a support device for a video camera in accordance with another preferred embodiment of the present invention.

As shown in FIG. 5, the support device further comprises two counterweights 522 mounted on the two clamping boards 52 respectively to increase the weight of the weight member 50.

Figure 6:
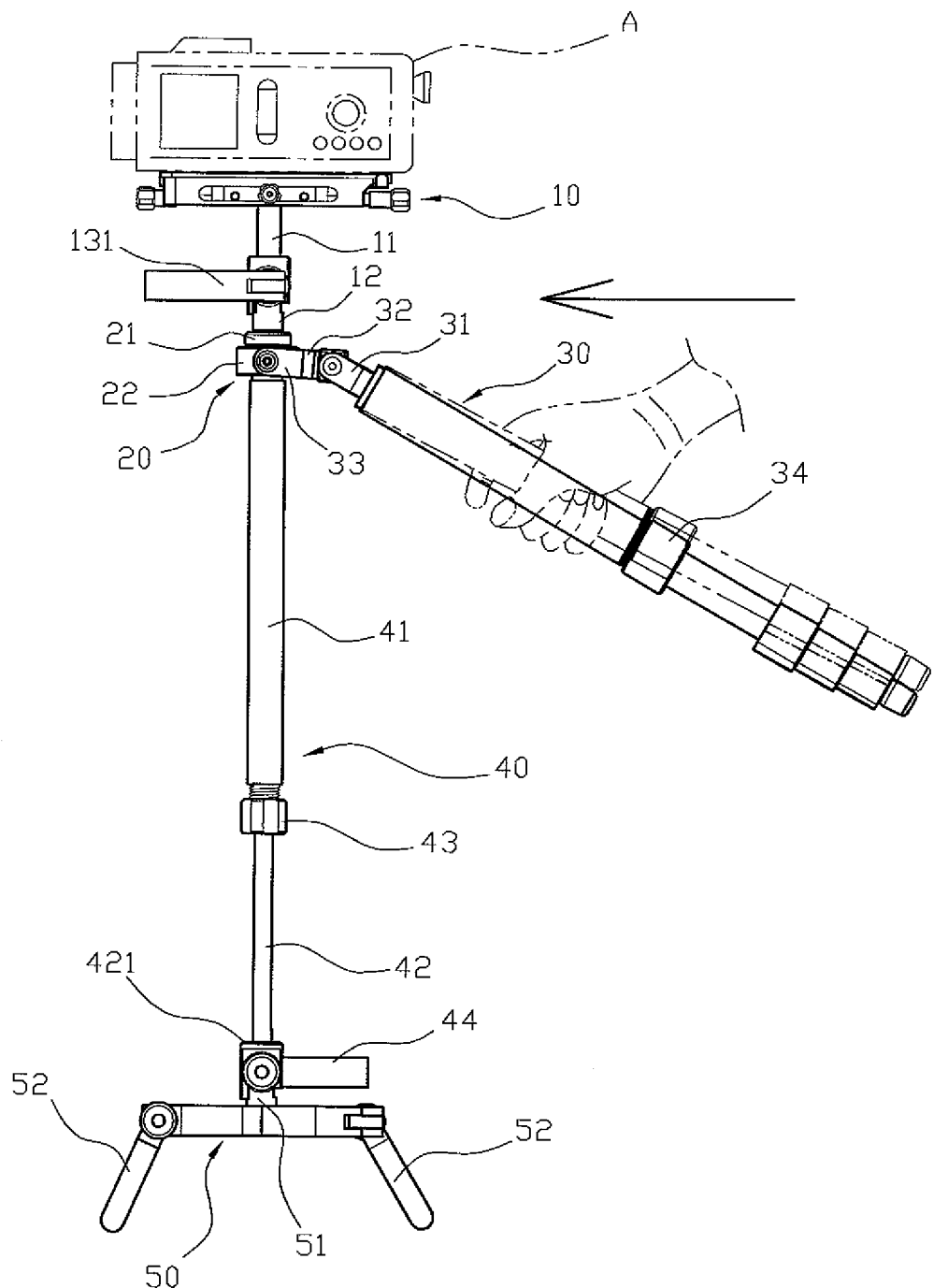
FIG. 6 is a schematic front operational view of the support device for a video camera as shown in FIG. 1.
Figure 7:
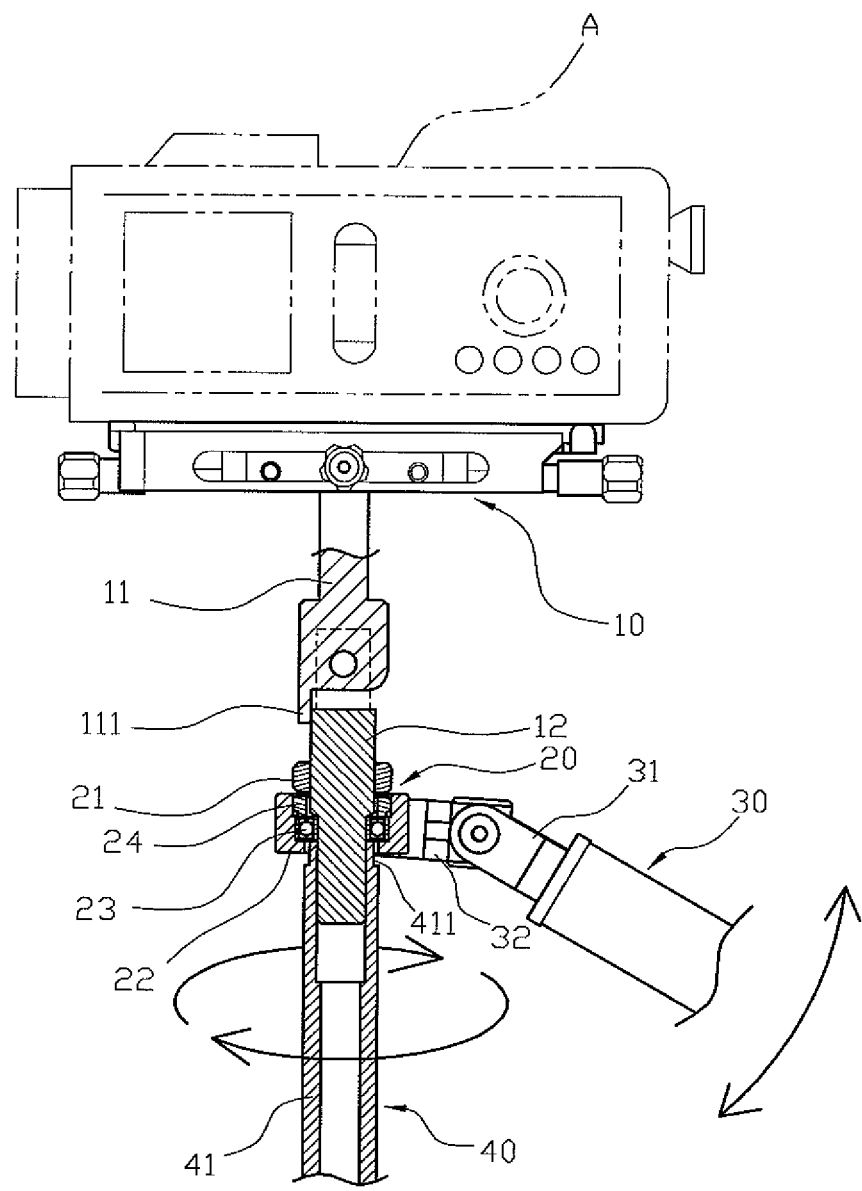
FIG. 7 is a schematic front cross-sectional operational view of the support device for a video camera as shown in FIG. 1.

In the first operation mode of the support device, referring to FIGS. 6 and 7 with reference to FIGS. 1-5, the main support unit 40 is disposed at a vertical state, and the auxiliary support unit 30 is disposed at an inclined state.

Thus, when a video camera "A" is placed on the platform 10, the auxiliary support unit 30 is held by a user's hand to carry and move the video camera "A". In such a manner, when the platform 10 is moved by the user, the platform 10 is kept at a horizontal state by provision of the weight member 50, the clamping boards 52 and the counterweights 522 so that the platform 10 and the video camera "A" are moved solidly and stably. In addition, the two pivot arms 33 of the pivot member 32 is pivoted about the two pivot holes 223 of the rotation sleeve 22 respectively so that the pivot member 32 is pivoted relative to the rotation sleeve 22 to eliminate sway or vibration produced during forward and backward movement of the auxiliary support unit 30 as shown in FIG. 6 such that the platform 10 and the video camera "A" are moved smoothly and stably. Further, when the auxiliary support unit 30 is swiveled leftward and rightward, the rotation sleeve 22 can be swiveled relative to the connecting rod 12 by the bearing 23 as shown in FIG. 7 so that the platform 10 and the video camera "A" are moved and directed forward without producing deflection.

Figure 8:
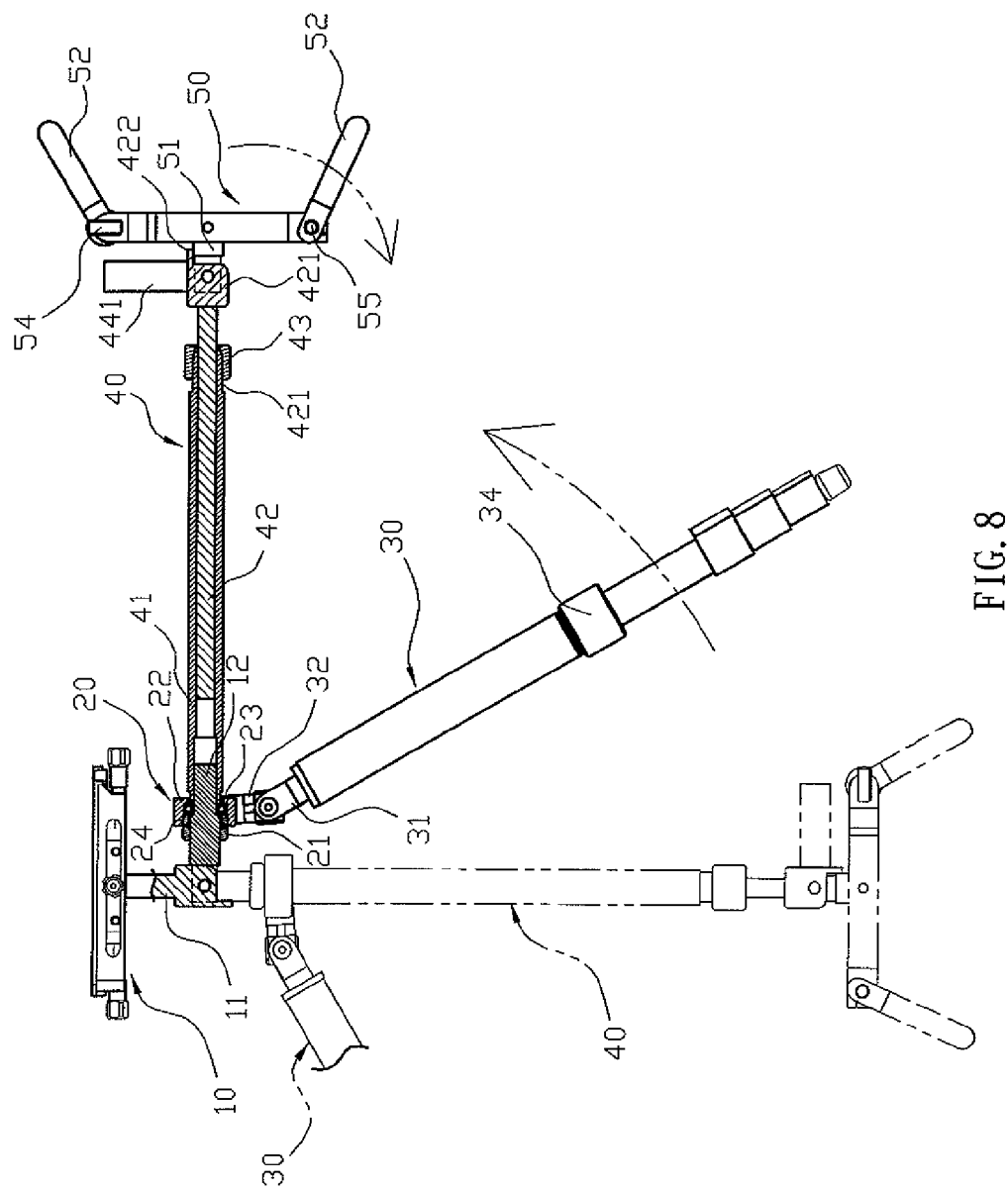
FIG. 8 is a schematic operational view of the support device for a video camera as shown in FIG. 4.
Figure 9:
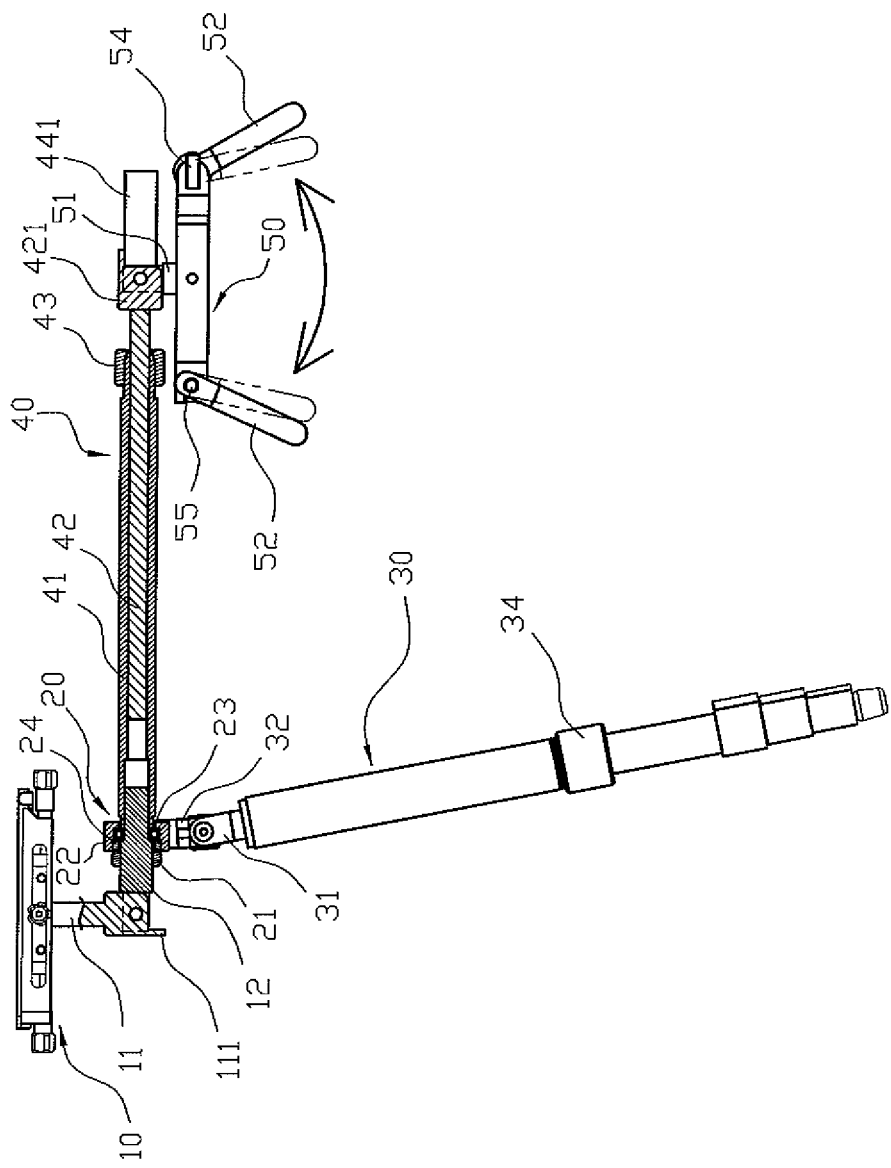
FIG. 9 is a schematic operational view of the support device for a video camera as shown in FIG. 8.

In the second operation mode of the support device, referring to FIGS. 8 and 9 with reference to FIGS. 1-5, when the auxiliary support unit 30 is swiveled, the rotation sleeve 22 is swiveled relative to the connecting rod 12 so that the auxiliary support unit 30 is moved relative to the main support unit 40 from a rightward position as shown in FIG. 4 to a leftward position as shown by phantom lines in FIG. 8. After the position adjustment of the auxiliary support unit 30 is finished, the locking member 21 is rotated on the first threaded portion 121 of the connecting rod 12 and is moved to press the stop member 24 to lock the rotation sleeve 22 onto the connecting rod 12 so that the rotation sleeve 22 cannot be rotated any more. Then, the quick release module 13 is loosened, and the connecting rod 12 is pivoted relative to the connecting plate 11 of the platform 10 so that the main support unit 40 is moved upward relative to the platform 10 until the main support unit 40 is parallel with the platform 10. Thus, the positions of the main support unit 40 and the auxiliary support unit 30 are interchanged from the state as shown in FIG. 4 to the state as shown in FIG. 8 so that the main support unit 40 is disposed at a horizontal state, and the auxiliary support unit 30 is disposed under the main support unit 40. Then, the quick release module 44 is loosened, and the pivot seat 51 of the weight member 50 is pivoted relative to the pivot portion 421 of the inner bar 42 so that the weight member 50 is moved downward relative to the main support unit 40 until the weight member 50 is parallel with the main support unit 40. Thus, the weight member 50 is disposed at a horizontal state as shown in FIG. 9. At this time, when the quick release member 54 is loosened, each of the two clamping boards 52 is pivoted relative to the weight member 50 to adjust the angle between each of the two clamping boards 52 and the weight member 50 as shown in FIG. 9.

Figure 10:
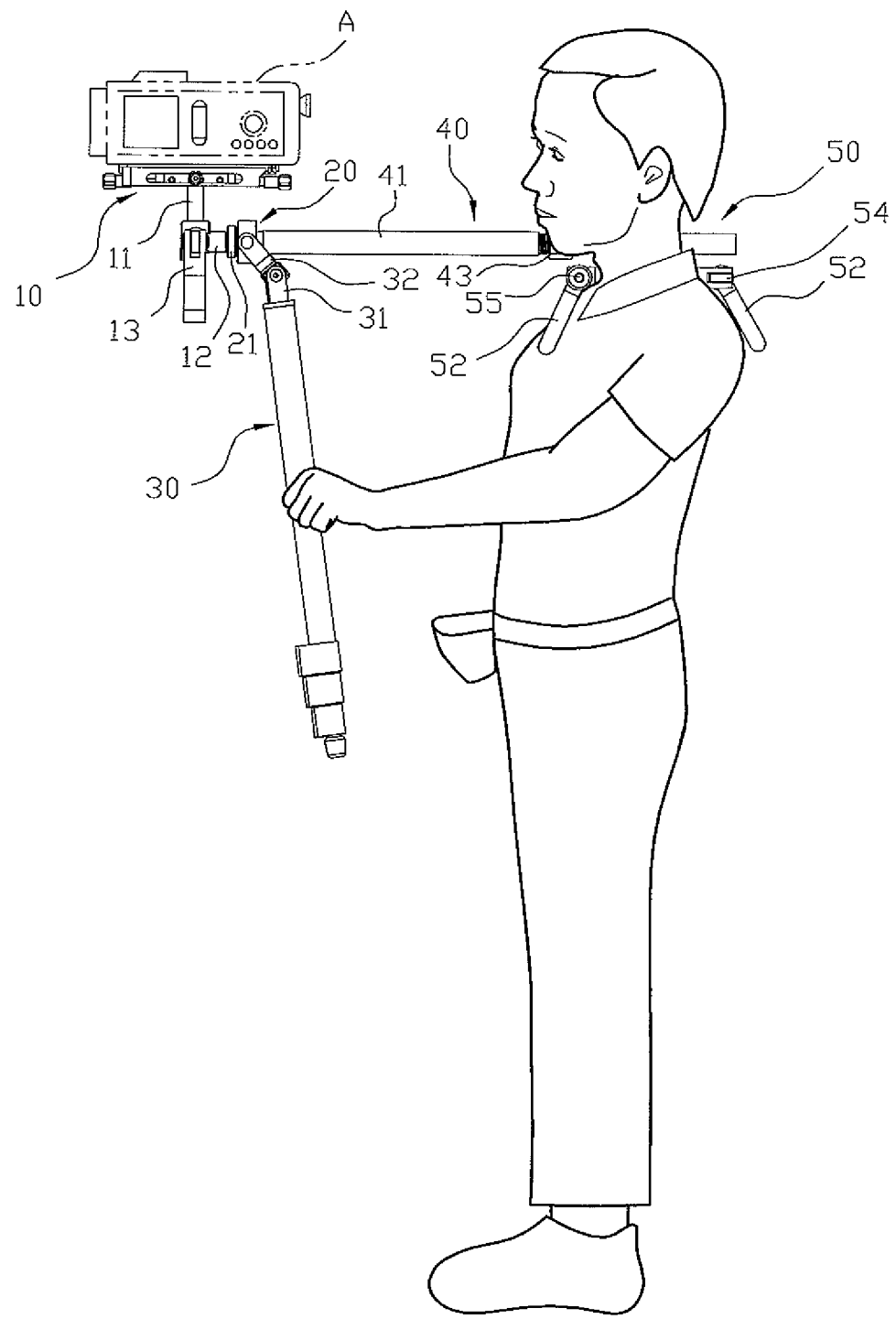
FIG. 10 is a schematic operational view of the support device for a video camera as shown in FIG. 9.

As shown in FIG. 10, the weight member 50 is placed on the user's shoulder, and the clamping boards 52 clamp the user's shoulder respectively. At this time, the auxiliary support unit 30 is held by the user's hand. Thus, the video camera "A" is supported by the user's shoulder and hand.

Figure 11:
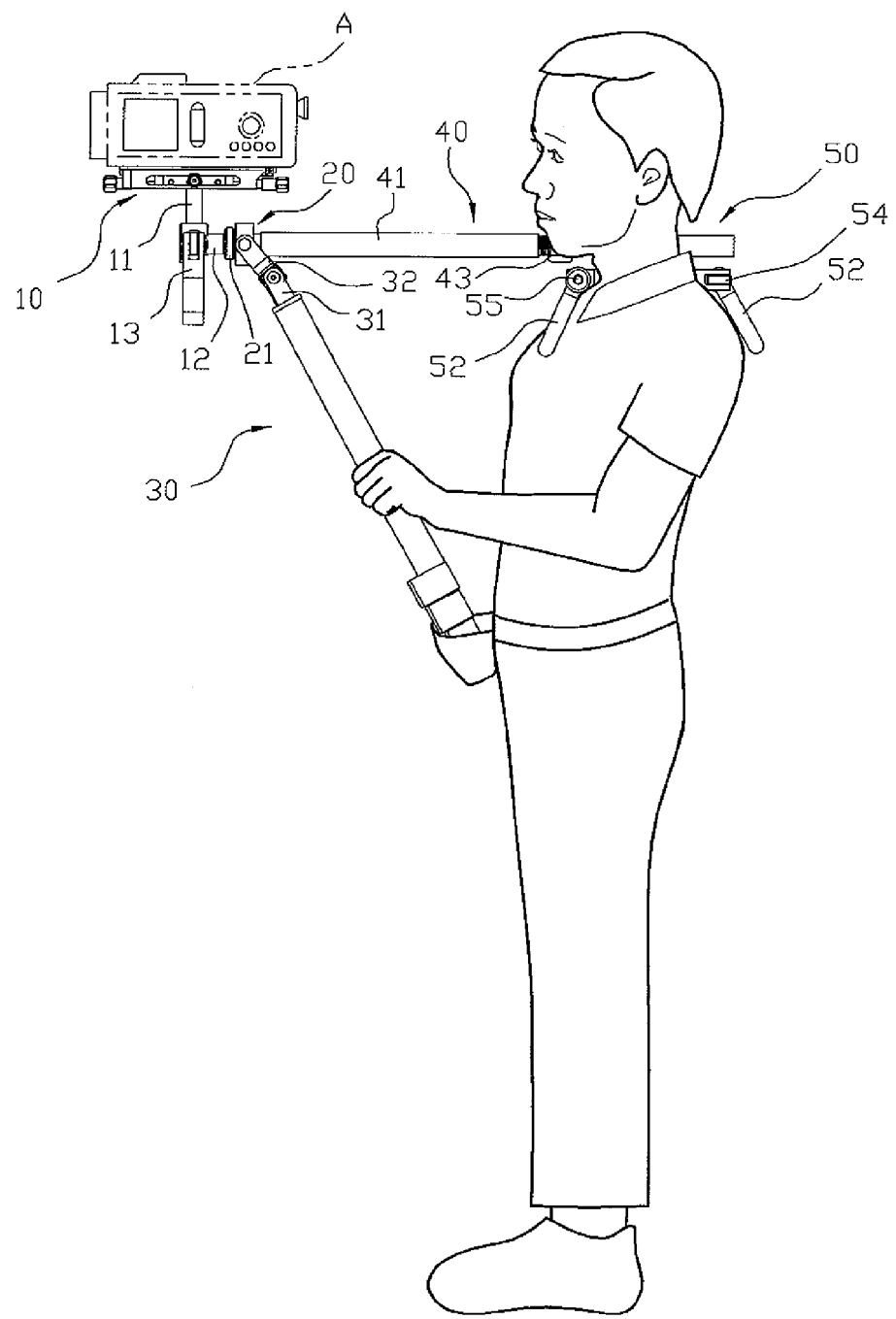
FIG. 11 is a schematic operational view of the support device for a video camera as shown in FIG. 9.

As shown in FIG. 11, the auxiliary support unit 30 abuts the user's waist.

Figure 12:
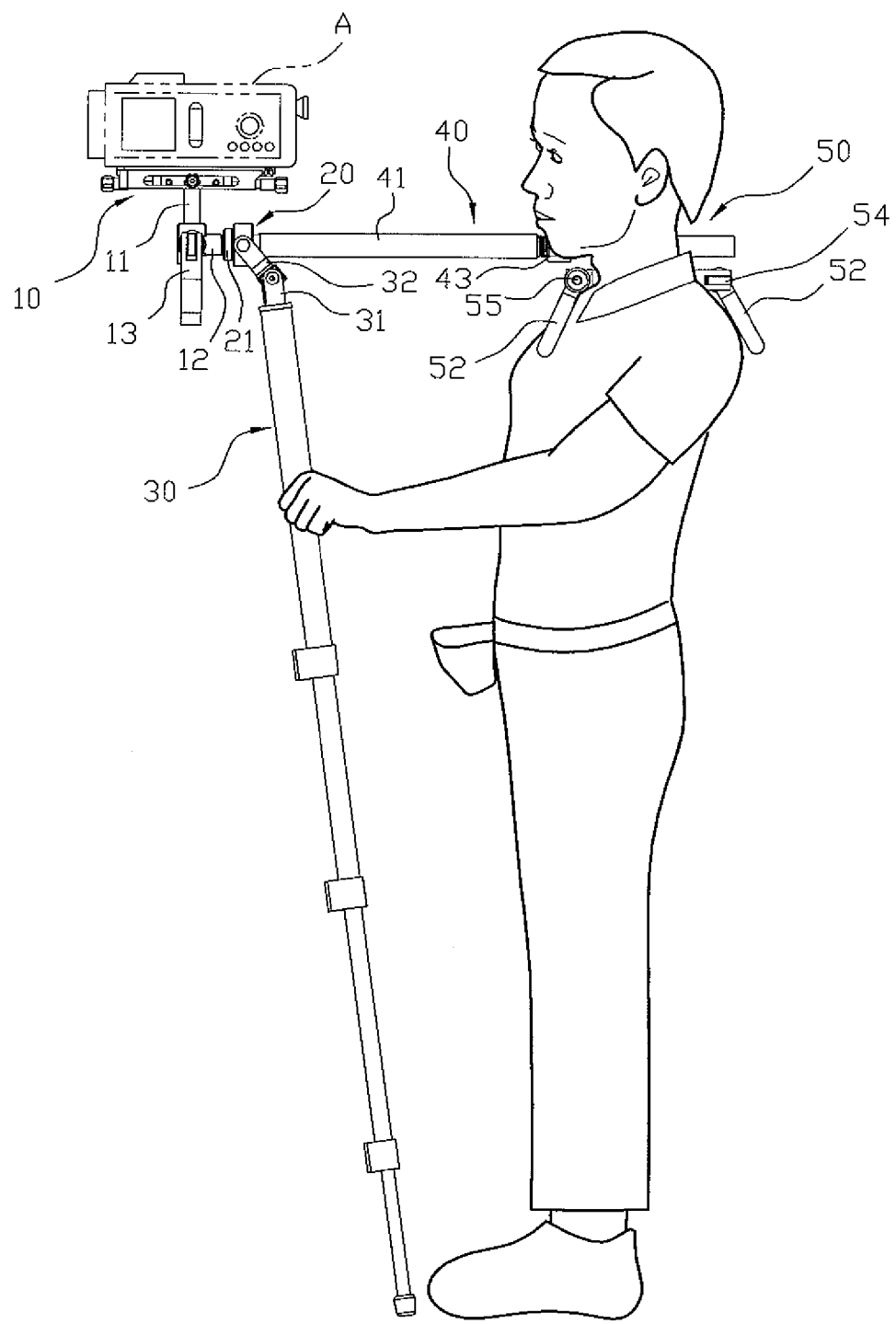
FIG. 12 is a schematic operational view of the support device for a video camera as shown in FIG. 9.

As shown in FIG. 12, the auxiliary support unit 30 is held by the user's hand and has a distal end supported by the ground.

Accordingly, the support device has two operation modes to facilitate the user carrying the video camera "A". In addition, when the platform 10 is moved by the user, the platform 10 is kept at a horizontal state by provision of the weight member 50, the clamping boards 52 and the counterweights 522 so that the video camera "A" is moved solidly and stably. Further, the two pivot arms 33 of the pivot member 32 can be pivoted about the two pivot holes 223 of the rotation sleeve 22 so that the pivot member 32 can be pivoted relative to the rotation sleeve 22 to eliminate sway or vibration produced during forward and backward movement of the auxiliary support unit 30 such that the video camera "A" is moved smoothly and stably. Further, when the auxiliary support unit 30 is swiveled leftward and rightward, the rotation sleeve 22 can be swiveled relative to the connecting rod 12 by the bearing 23 so that the video camera "A" is moved and directed forward without producing deflection. Further, when the auxiliary support unit 30 is held by the user's hand, the weight member 50 is placed on the user's shoulder with the clamping boards 52 clamping the user's shoulder, so that the burden of the video camera "A" is shared by the user's shoulder and hand.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A support device comprising:
a platform;
a connecting rod connected with the platform;
a main support unit connected with the connecting rod;
a weight member connected with the main support unit;
two opposite clamping boards each pivotally mounted on the weight member;
a swivel mechanism swivelably mounted between the connecting rod and the main support unit;
a pivot member pivotally mounted on the swivel mechanism; and
an auxiliary support unit connected with the pivot member, wherein:
the platform has a side provided with a connecting plate;
the connecting rod has a first end pivotally connected with the connecting plate of the platform;
the connecting rod has a second end provided with a first threaded portion, a stepped abutting portion and a second threaded portion;
the swivel mechanism includes:
a rotation sleeve swivelably mounted on the connecting rod;
a bearing mounted in the rotation sleeve and having a first side abutting the abutting portion of the connecting rod;
a stop member secured in the rotation sleeve and abutting the bearing to limit the bearing in the rotation sleeve; and
a locking member mounted on the first threaded portion of the connecting rod and movable to press the stop member to releasably lock the rotation sleeve onto the connecting rod;
the rotation sleeve of the swivel mechanism has an outer wall provided with two opposite pivot holes;
the rotation sleeve of the swivel mechanism has an inner portion provided with a receiving hole to receive the bearing;
the auxiliary support unit has an end portion provided with a pivot bracket which is pivotally connected with the pivot member;
the pivot member has a side provided with two opposite pivot arms pivotally connected with the two pivot holes of the rotation sleeve respectively with the pivot member pivotally connected with the rotation sleeve;
the main support unit includes:
an outer tube; and
an inner bar retractably mounted on the outer tube;
the outer tube of the main support unit has a first end provided with an inner threaded portion screwed onto the second threaded portion of the connecting rod and abutting a second side of the bearing with the bearing sandwiched between the connecting rod and the outer tube;
the inner bar of the main support unit has a first end movable in the outer tube and a second end provided with a pivot portion; and
the weight member has a side provided with a pivot seat pivotally connected with the pivot portion of the inner bar.
2. The support device of claim 1, wherein;
each of the two opposite clamping boards is pivotally connected with the weight member by a quick release member and a fastening nut;
the weight member has two opposite ends each provided with a through hole to allow passage of the quick release member; and
each of the two opposite clamping boards has an end portion each provided with a through bore to allow passage of the quick release member.
3. The support device of claim 1, wherein:
the outer tube of the main support unit has a second end provided with an outer threaded portion; and the main support unit further includes an adjusting nut screwed onto the outer threaded portion of the outer tube to releasably lock the outer tube onto the inner bar to adjust a length of the outer tube and the inner bar.

4. The support device of claim 1, wherein:

the first end of the connecting rod is pivotally connected with the connecting plate of the platform by a quick release module and a locking nut; and the connecting plate of the platform is provided with a protruding limit strip abutting a peripheral wall of the connecting rod to limit a pivot angle of the connecting rod relative to the connecting plate with the connecting rod in line with the connecting plate.

5. The support device of claim 4, wherein:

the quick release module is provided with a drive handle; and the support device further comprises a catch block mounted on the quick release module and located between the connecting rod and the drive handle of the quick release module to limit the drive handle of the quick release module when the quick release module is loosened.

6. The support device of claim 1, wherein:

the pivot seat of the weight member is pivotally connected with the pivot portion of the inner bar by a quick release mechanism and a locating nut; and the pivot portion of the inner bar is provided with a protruding limit flange to abut a peripheral wall of the pivot seat to limit a pivot angle of the pivot seat and the weight member relative to the inner bar with the inner bar in line with the pivot seat and perpendicular to the weight member.

7. The support device of claim 6, wherein:

the quick release mechanism is provided with a drive handle; and the support device further comprises a catch piece mounted on the quick release mechanism and located between the pivot seat of the weight member and the drive handle of the quick release mechanism to limit the drive handle of the quick release mechanism when the quick release mechanism is loosened.

8. The support device of claim 1, further comprising two counterweights mounted on the two opposite clamping boards respectively.

9. The support device of claim 1, wherein:

the abutting portion of the connecting rod is disposed between the first threaded portion and the second threaded portion;

the first threaded portion of the connecting rod has a diameter greater than that of the second threaded portion;

the receiving hole of the rotation sleeve is mounted on the connecting rod and has a peripheral wall provided with an inner thread;

the stop member of the swivel mechanism is an outer threaded ring which is screwed into the inner thread of the rotation sleeve;

the stop member of the swivel mechanism surrounds the first threaded portion of the connecting rod;

the locking member of the swivel mechanism is an inner threaded ring which is screwed onto the first threaded portion of the connecting rod;

the bearing of the swivel mechanism surrounds the second threaded portion of the connecting rod and is disposed between the stop member and the rotation sleeve;

the auxiliary support unit is a telescoping arrangement;

the two pivot arms of the pivot member are pivotable about the two pivot holes of the rotation sleeve respectively with the pivot member pivotable relative to the rotation sleeve; and the inner threaded portion of the outer tube is inserted into the receiving hole of the rotation sleeve.

* * * * *